(12) United States Patent
Chaudhri

(10) Patent No.: US 8,230,358 B1
(45) Date of Patent: Jul. 24, 2012

(54) DEFINING MOTION IN A COMPUTER SYSTEM WITH A GRAPHICAL USER INTERFACE

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1928 days.

(21) Appl. No.: 10/874,788

(22) Filed: Jun. 22, 2004

(51) Int. Cl.
*G06F 3/048* (2006.01)

(52) U.S. Cl. .......... 715/773; 715/764; 715/767; 715/863

(58) Field of Classification Search ................... 715/764, 715/863, 767, 773
See application file for complete search history.

(56) References Cited

U.S. PATENT DOCUMENTS

| | | | |
|---|---|---|---|
| 5,511,157 A | 4/1996 | Wang | |
| 5,581,670 A | 12/1996 | Bier et al. | |
| 5,590,219 A * | 12/1996 | Gourdol | 382/202 |
| 5,861,889 A | 1/1999 | Wallace et al. | |
| 6,407,749 B1 | 6/2002 | Duke | |
| 7,020,853 B2 | 3/2006 | Skoll et al. | |
| 2003/0043209 A1* | 3/2003 | Pearson | 345/835 |
| 2004/0196267 A1* | 10/2004 | Kawai et al. | 345/173 |
| 2005/0028111 A1* | 2/2005 | Schrag et al. | 715/851 |
| 2005/0231512 A1 | 10/2005 | Niles et al. | |
| 2010/0201692 A1* | 8/2010 | Niles et al. | 345/473 |

OTHER PUBLICATIONS

Jay Arraich's Photoshop Tips—Bevel and Emboss, Webpage [online]. www.arraich.com [retrieved from the Internet on Feb. 12, 2007] Archived from Dec. 15, 2002 <URL: http://web.archive.org/web/20021215194054/www.arraich.com/effects1/aaeffects_main.htm>.*

Jay Arraich's Photoshop Tips—Drop Shadow, Webpage [online]. www.arraich.com [retrieved from the Internet on Feb. 12, 2007] Archived from Dec. 15, 2002 <URL: http://web.archive.org/web/20021215195819/www.arraich.com/effects1/dropshadow.htm>.*

Developing Webs Photoshop Tutorials—Creating a Drop Shadow Effect on Text, Webpage [online]. www.dwphotoshop.com [retrieved from the Internet on Feb. 12, 2007] Archived from Dec. 2, 2003 <URL: http://web.archive.org/web/20031220105045/http://www.dwphotoshop.com/photoshop/dropshadow.php>.*

* cited by examiner

*Primary Examiner* — Ba Huynh
(74) *Attorney, Agent, or Firm* — Adeli & Tollen LLP

(57) ABSTRACT

Some embodiments of the invention provide a method that defines movement in a graphical user interface (GUI) of a computer system. This method detects an interaction between a cursor and a first object in the GUI. Based on this interaction, the method moves a second object in the GUI. In some embodiments, the movement of the second object is a rotational movement within the GUI. In other embodiments, the second object's movement is a translation movement, such as a rectilinear translation movement or a curvilinear translation movement. Also, in some embodiments, the second object relates to a special effect that is applied to another object in the GUI. For instance, in some embodiments, the second object is a shadow of a third object in the GUI.

36 Claims, 12 Drawing Sheets

DEFINING MOTION IN A COMPUTER SYSTEM WITH A GRAPHICAL USER INTERFACE

FIELD OF THE INVENTION

The present invention relates to defining motion in a computer system with a graphical user interface.

BACKGROUND OF THE INVENTION

Today, computer programs allow users to perform many tasks and functions. Some of the most popular computer programs include word processing and computer aided design ("CAD") programs. These programs allow users to create various text and drawings with ease. These programs also have many different features that allow users to create very complex and intricate text and drawings.

Applying shadows to text is an example of a feature that some computer systems provide. However, most systems do not allow a user to customize their application of shadow effects to text. For instance, most systems do not allow their users to define the location of the shadow relative to the text and/or to modify the appearance of the shadow.

Therefore, there is a need in the art for a method that allows a user to customize the application of shadow effects to text. There is also a need for a method that allows a user to apply a shadow effect to text in a more intuitive manner, and to provide real-time feedback of the changes to the user. Ideally, such methods can be used to apply other effects and/or to define motion of other objects in a GUI.

SUMMARY OF THE INVENTION

Some embodiments of the invention provide a method that defines movement in a graphical user interface (GUI) of a computer system. This method detects an interaction between a cursor and a first object in the GUI. Based on this interaction, the method moves a second object in the GUI. In some embodiments, the movement of the second object is a rotational movement within the GUI. In other embodiments, the second object's movement is a translation movement, such as a rectilinear translation movement or a curvilinear translation movement. Also, in some embodiments, the second object relates to a special effect that is applied to another object in the GUI. For instance, the second object is a shadow of a third object in the GUI in some embodiments.

DETAILED DESCRIPTION OF THE INVENTION

Figure 1:
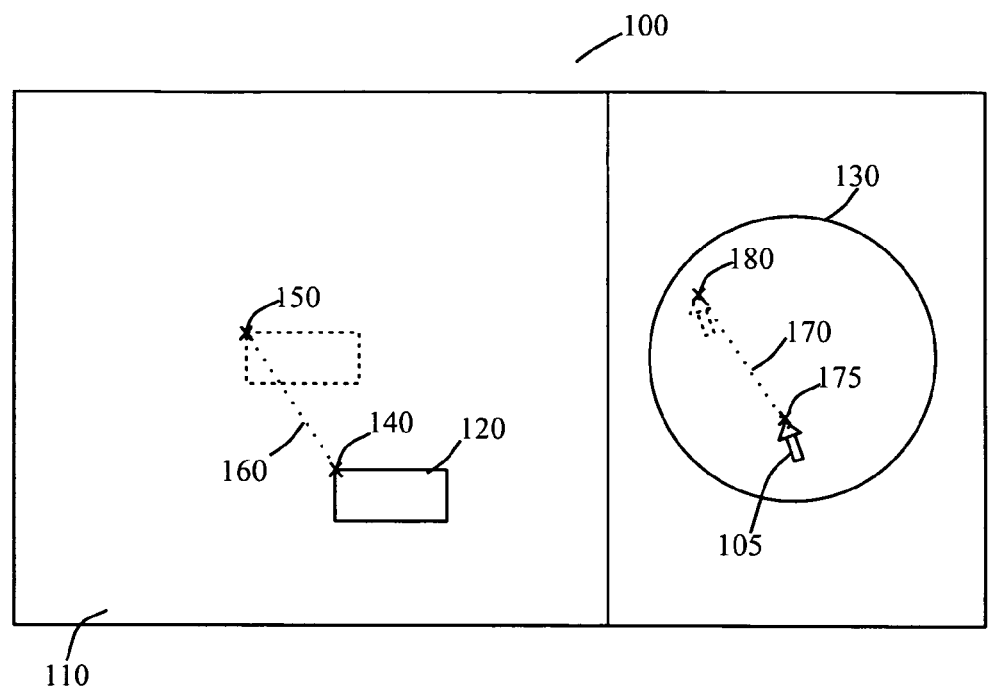
FIG. 1 illustrates of an embodiment of the invention that correlates a cursor movement across one object in the GUI to rectilinear translation movement of another object in the GUI.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

I. Definitions

A graphical user interface ("GUI") is an interface of a computer system that allows users to interact with the computer system through images and text. A GUI allows users of the computer system to interact with the computer system in an intuitive graphical manner. Instead of learning and writing complex command languages, users can perform many operations by simply interacting with the visual components of a GUI, which are often easy to understand. A GUI often includes a cursor pointer, icons, desktop, windows, etc. The cursor pointer (the "cursor") is a pointer that a user can move across the GUI through the operation of a cursor controller, such as a mouse, a trackpad, trackball, etc. A user can use the cursor to select objects in the GUI. For instance, the user can select an object by directing the cursor to the object and performing a click operation (e.g., through a button of the cursor controller).

Icons are examples of selectable objects in a GUI. Icons are used to represent folders, files, commands, etc. in the GUI. An icon can be represented by a text component, an image component, or both text and image components. The desktop refers to the contents on a display screen below any windows. A window is an area on the display screen that displays its own file, message, application, etc. independently of other windows that are displayed on the display screen.

In some embodiments, text includes any computer data that represents alphabets, words, numbers, symbols, mathematical signs, strings and other typographical characters, or any combination thereof. Also, in some embodiments, an effect that is applied to text modifies attributes, characteristics, features, display, etc. of the text.

In this document, a translation movement of an object is a movement of the object where every point in the object moves in the same direction. A rectilinear translation movement is when every point in the object moves in a straight line. A curvilinear translation movement is when every point in the object moves along a curved path. Curvilinear translation movement is different than rotational movement of an object. In rotational movement, each point of an object moves in a curvilinear direction about a rotation axis, except the set of points of the object that are on the rotation axis. In rotational movement, the object's point or points that are on the rotation axis do not move. On the other hand, in curvilinear translation motion, every point of an object moves within a coordinate system that is used to define the object.

II. Overview

Some embodiments of the invention provide a method that defines movement in a graphical user interface (GUI) of a computer system. This method detects an interaction between a cursor and a first object in the GUI. Based on this interaction, the method moves a second object in the GUI. In some embodiments, the movement of the second object is a rotational movement within the GUI. In other embodiments, the second object's movement is a translation movement, such as a rectilinear translation movement or a curvilinear translation movement.

FIG. 1 illustrates an example of an embodiment of the invention that correlates a cursor movement across one object in the GUI to a rectilinear translation movement of another object in the GUI. Specifically, this figure illustrates a portion of a GUI 100 that includes a display section 110, an object 120 in the display section 110, and a cursor-interface icon 130. All these elements are part of the same window in some embodiments, while they are parts of two or more windows in other embodiments.

Cursor-interface icon 130 allows a user to modify the position of the object 120 in the display section 110. Specifically, FIG. 1 illustrates a translation motion of a cursor 105 across the icon 130 along a translation vector 170. A user can define such a motion through a click-and-drag operation, e.g., by clicking on the icon 130 at the position 175 and dragging the cursor to the position 180. As shown in FIG. 1, some embodiments capture the translation motion across the icon 170, and correlate this motion to a movement of the object 120 from a position 140 to a position 150 in the display section along a translation vector 160.

Figure 2:
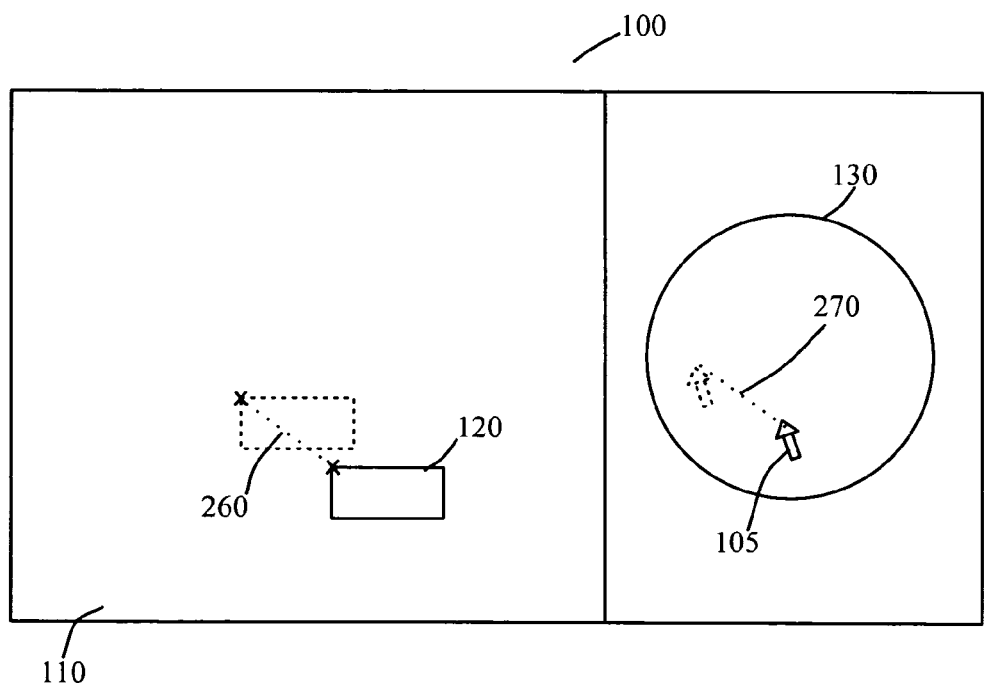
FIG. 2 illustrates a cursor movement along a rectilinear direction that results in a rectilinear movement of a cursor.
Figure 3:
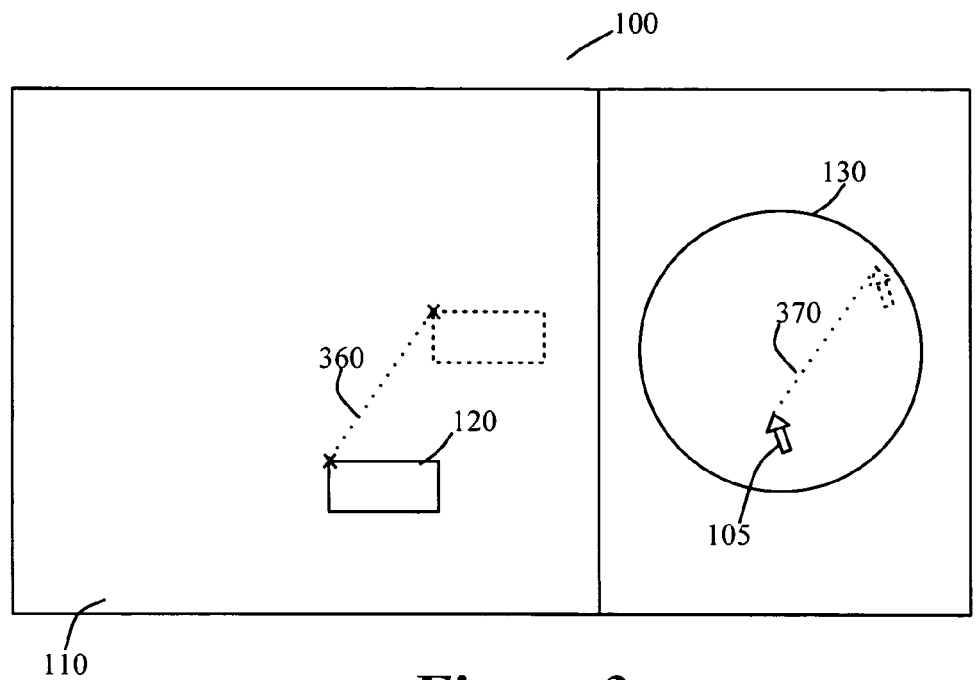
FIG. 3 illustrates a cursor movement along another rectilinear direction that results in another rectilinear movement of the cursor.

The cursor-interface icon 130 can capture rectilinear cursor movements along non-parallel, non-collinear rectilinear directions. For instance, FIGS. 2 and 3 illustrate cursor movements along two other rectilinear directions 270 and 370, which result in the movement of object 120 in two other rectilinear directions 260 and 360. As shown in FIGS. 1-3, the captured cursor directions 170, 270, and 370 are neither parallel nor collinear to each other. The resulting directions 160, 260, and 360 of moving the object 120 are also neither parallel nor collinear to each other, as shown in FIGS. 1-3.

Figure 4:
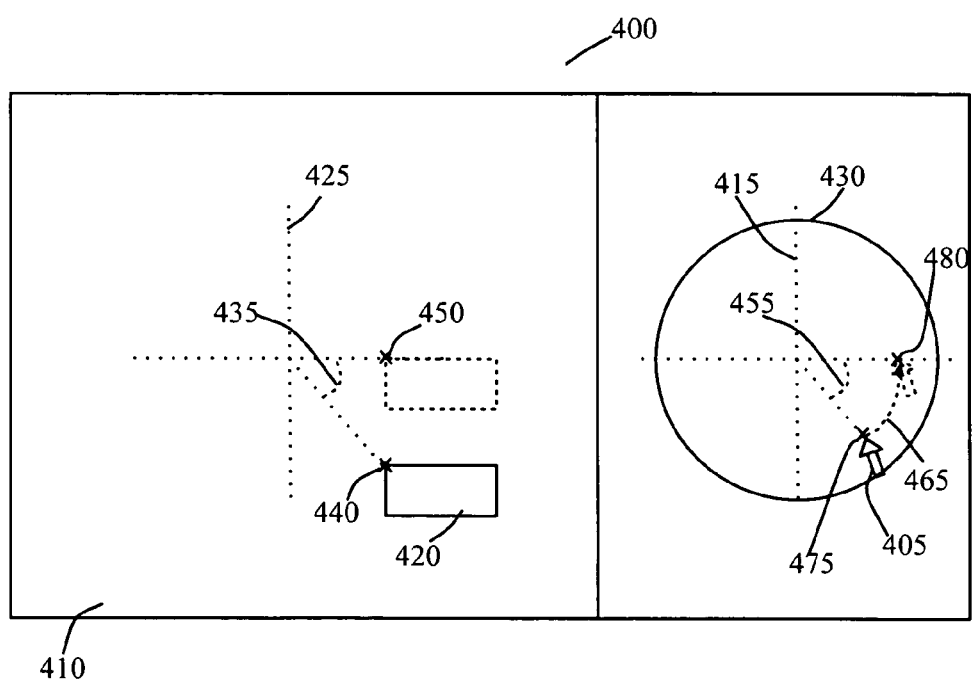
FIG. 4 illustrates an embodiment of the invention that correlates cursor movements across one object in the GUI to curvilinear translation movements of another object in the GUI.

FIG. 4 illustrates an example of an embodiment of the invention that correlates cursor movements across one object in the GUI to curvilinear translation movements of another object in the GUI. Specifically, this figure illustrates a portion of a GUI 400 that includes a display section 410, an object 420 in the display section 410, and a cursor-interface icon 430. Like the elements of the GUI 100 of FIG. 1, the elements of the GUI 400 are all part of the same window in some embodiments, while they are parts of two or more windows in other embodiments.

Cursor-interface icon 430 allows a user to modify the angular position of the object 420 within a coordinate system 425 of the display section 410. Specifically, FIG. 4 illustrates a curvilinear path 465 of a cursor 405 across the icon 430. A user can define such a motion through a click-and-drag operation, e.g., by clicking on the icon 430 at the position 475 and dragging the cursor to the position 480 through the curvilinear path 465. As shown in FIG. 4, the curvilinear path 465 defines an angular displacement 455 within a coordinate system 415 of the icon 430. As further shown in this figure, some embodiments correlate the displacement angle 455 to an angular displacement angle 435 in the display section 410. This angular displacement 435 defines a rotation of the object 420 from a position 440 to a position 450 within the coordinate system 425 of the display section.

Figure 5:
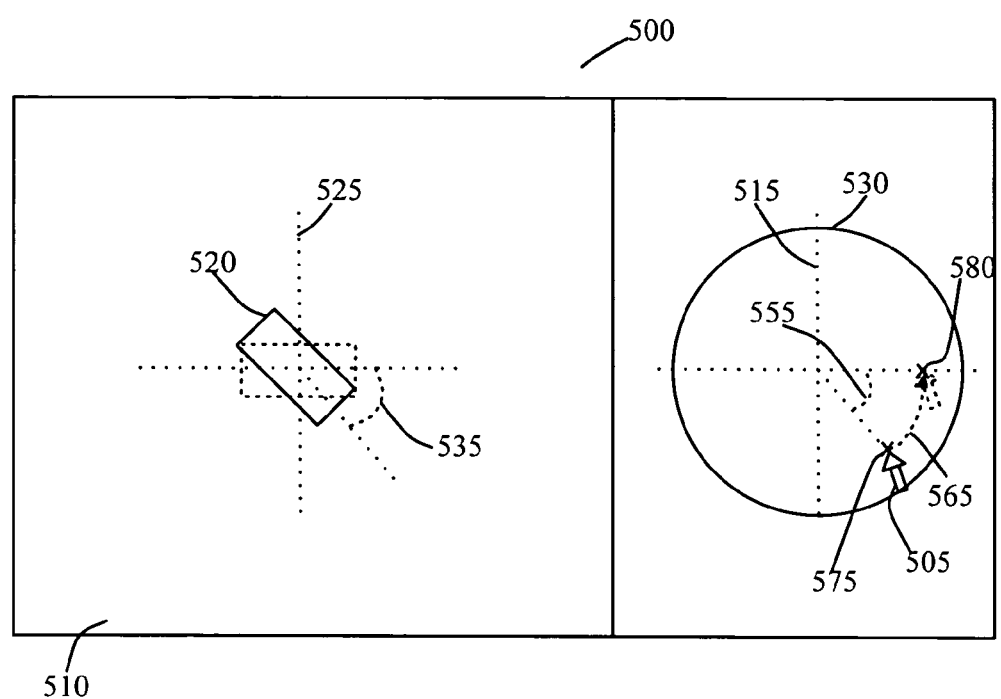
FIG. 5 illustrates an embodiment of the invention that correlates cursor movements across one object in the GUI to curvilinear rotational movements of another object in the GUI.

FIG. 5 illustrates an example of an embodiment of the invention that correlates cursor movements across one object in the GUI to rotational movements of another object in the GUI. Specifically, this figure illustrates a portion of a GUI 500 that includes a display section 510, an object 520 in the display section 510, and a cursor-interface icon 530. Like the elements of the GUI's 100 and 400 of FIGS. 1 and 4, the elements of the GUI 500 are all part of the same window in some embodiments, while they are parts of two or more windows in other embodiments.

Cursor-interface icon 530 allows a user to modify the rotational position of the object 520 with respect a coordinate system 525 of the object 520. Specifically, FIG. 5 illustrates a curvilinear path 565 of a cursor 505 across the icon 530. A user can define such a motion through a click-and-drag operation, e.g., by clicking on the icon 530 at the position 575 and dragging the cursor to the position 580 through the curvilinear path 565. As shown in FIG. 5, the curvilinear path 565 defines an angular displacement 555 within a coordinate system 515 of the icon 530. As further shown in this figure, some embodiments correlate the displacement angle 555 to an angular rotation angle 535 within the coordinate system 525 of the object 520. This rotation angle 535 defines a rotation of the object 520 that is illustrated in FIG. 5.

In the examples presented in FIGS. 1-5, the cursor-movement detection operation commences when a user clicks on a cursor-interface icon. Some embodiments, however, commence such an operation (i.e., start detecting the cursor movement) when a user clicks somewhere in the vicinity of the cursor-interface icon (i.e., clicks on a region that encompasses the cursor-interface icon and a boundary region surrounding this icon).

III. Applying Effects

Examples of objects in the GUI that can be moved through the invention's cursor-interface icon include characters, images, icons, etc. Such objects also include objects associated with special effects that are applied to other objects in the GUI. For instance, in some embodiments, the invention is used to apply an effect to a text in a graphical user interface of a computer system. Some of these embodiments identify cursor interactions with a cursor-interface icon and correlate these interactions with modification of an effect that is applied to the text. For example, some embodiments redefine a position attribute associated with an effect based on the cursor movement along the cursor-interface icon.

In some embodiments, the effect defines a shadow for the text, and the movement of the effect entails redefining the position of the shadow. Several embodiments relating to the application of shadow effects to text are described below. However, one of ordinary skill will realize that other embodiments of the invention are used in conjunction with other effects that are applied to text.

FIGS. 6-18 illustrate several embodiments of the invention that relate to the application of shadow effects to text. These figures and the description of these figures present numerous specific GUI elements (e.g., boxes, circular sliders, etc.) for implementing several embodiments of the invention. However, one of ordinary skill will realize that the invention can be practiced without these specific elements.

Figure 6:
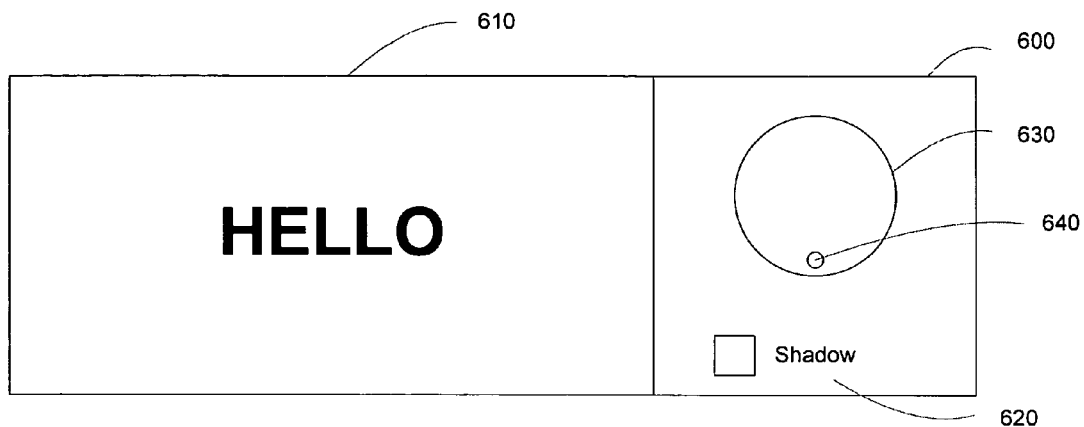
FIG. 6 illustrates a block diagram of a GUI for applying and modifying shadow on a text.

FIG. 6 illustrates a portion of a GUI 600 that includes a text field 610, a shadow-enable box 620, a cursor-interface icon 630, and a knob icon 640. All these elements are part of the same window in some embodiments, while they are parts of two or more windows in other embodiments.

The text field 610 is a location in the GUI where a user can view text. For instance, in the example illustrated in FIG. 6, "HELLO" is displayed in this field. In some embodiments, the user can enter text into this field. In the embodiments described below, this field is also the location where the user can view the application of a shadow effect to the text and can view modifications to this effect. The text field 610 is only a box within a window in some embodiments, while it is its own separate window in other embodiments.

Figure 7:
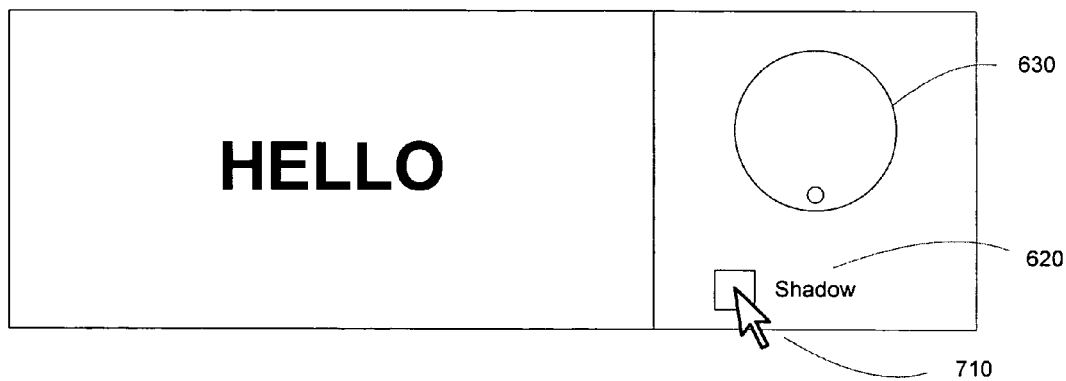
FIG. 7 illustrates a block diagram of a GUI showing a cursor before enabling the shadow option.
Figure 8:
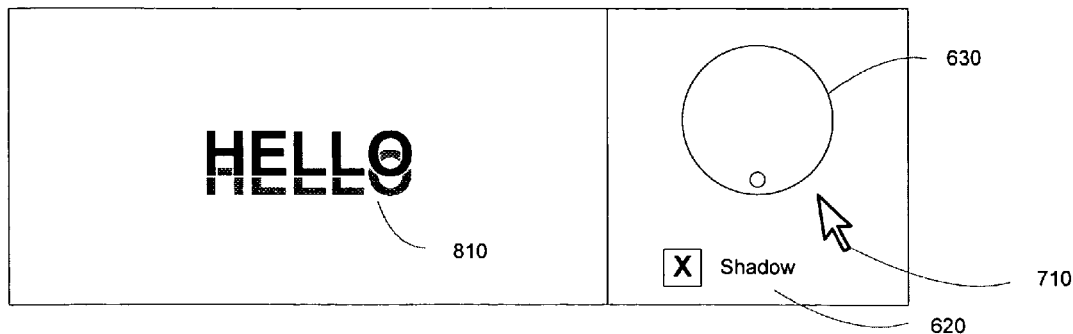
FIG. 8 illustrates a block diagram of a GUI with a shadow option selected.

The shadow-enable box 620 is a component of the GUI 600 that allows a user to enable the shadow effect for a text that is represented in the text field 610. Specifically, in some embodiments, a user enables the shadow effect by placing a mark within this box. A mark can be placed within this box in a number of different ways. For instance, FIG. 7 illustrates that the box can be marked by moving the cursor 710 of the GUI over the box and performing a click operation. When the shadow-enable box is checked, the shadow effect is applied to the text displayed in the text field 610. FIG. 8 illustrates the result of this application to the text "HELLO" in the text field 610. Specifically, this figure illustrates the word "HELLO" as having a shadow 810. This shadow appears directly below the text "HELLO". As further described below, this position is based on a position angle that is specified by the cursor-interface icon 630 at the moment that the user has selected the shadow-enable box 620.

The cursor-interface icon 630 is another component of the GUI 600. The cursor-interface icon 630 allows the user to modify the position of the shadow relative to the text, once the user selects the shadow option through the shadow-enable box 620. Specifically, at any time after the selection of the shadow option, this element specifies an angle, which corresponds to the relative angle of the shadow 810 with respect to the text. A user can modify the relative angle between the shadow 810 and the text in the text field 610 by changing the angle specified by the cursor-interface icon 630. In some embodiments, the user changes the angle that the cursor-interface icon 630 specifies by performing a click-and-drag operation that selects the cursor-interface icon 630 and that correlates the cursor movement captured after the selection to a change of the angle.

Figure 9:
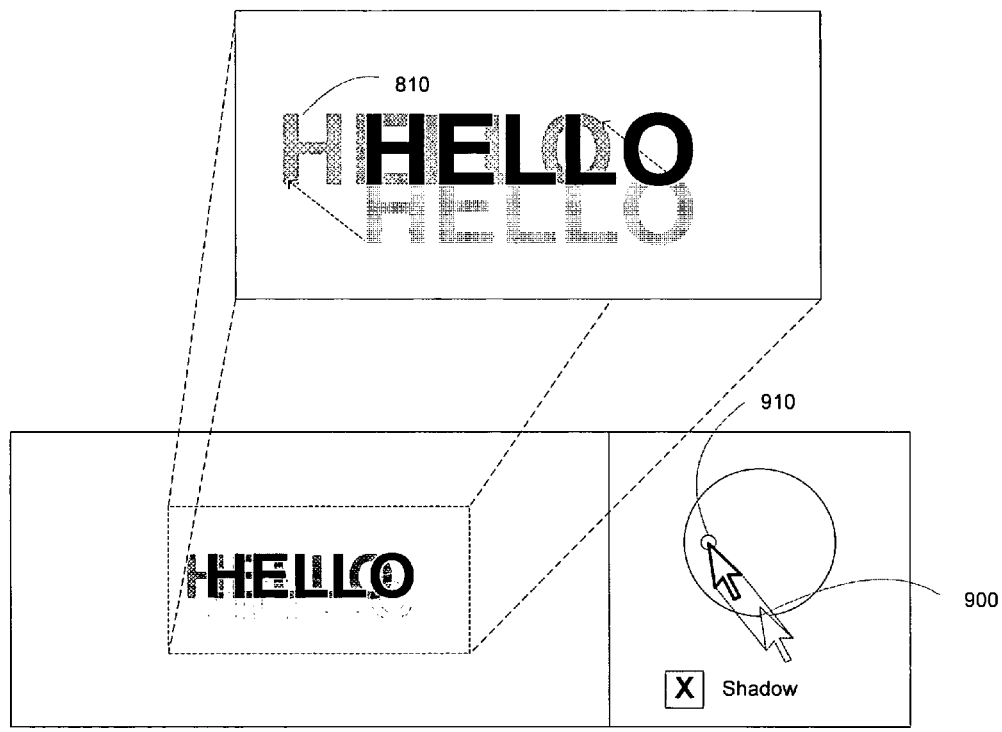
FIG. 9 illustrates a block diagram of a GUI showing a cursor selecting a cursor interface.

FIG. 9 illustrates an example of this functionality. The operation in this figure follows the operation and result illustrated in FIGS. 7 and 8, i.e., follows the selection of the shadow option as illustrated in FIG. 7 and the ensuing application of the shadow 810 as illustrated in FIG. 8. FIG. 9 illustrates that moving the cursor 710 from a position 900 in a clockwise direction to a position 910 moves the shadow 810 from a position directly below the text "HELLO" to a position that is left of the text "HELLO".

The knob icon 640 is yet another component of the GUI 600. The knob icon 640 allows the user to see the orientation of the cursor-interface icon 630. Accordingly, in some embodiments, the knob icon 640 allows the user to see the orientation and movement of the cursor-interface icon 630 as changes are made to the angle that the cursor-interface icon 630 specifies when a click-and-drag operation is performed that selects the cursor-interface icon 630 and that correlates the cursor movement captured after the selection to a change of the angle.

Figure 10:
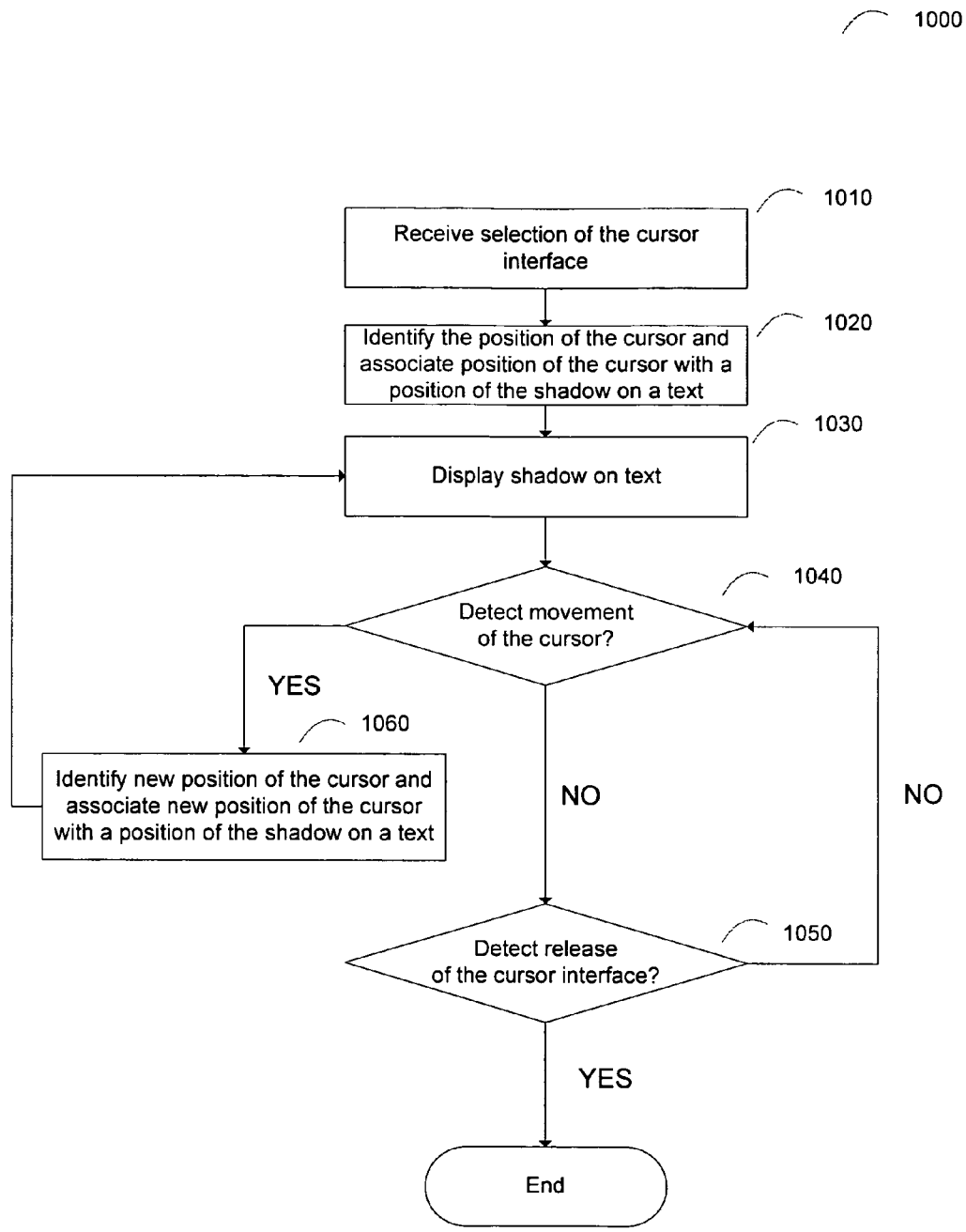
FIG. 10 illustrates a flow chart of a process for applying and modifying shadow effects.

FIG. 10 illustrates a process 1000 that a GUI performs in some embodiments. The GUI performs this process each time that a user interacts with the cursor-interface icon 630 after enabling the shadow effect through the shadow-enable box 620. As shown in FIG. 10, the process 1000 starts (at 1010) when the user selects the cursor-interface icon 630 after enabling the shadow effect. In some embodiments, a user can select the cursor-interface icon 630 by clicking on or near the cursor-interface icon 630 (i.e., on a region that encompasses the cursor-interface icon and a boundary region around the cursor-interface icon 630).

The process next (at 1020) identifies the position of the cursor within a coordinate system of the cursor-interface icon and associates this position with a position of the shadow with respect to the text displayed in the text field 610. Some embodiments express this position within a coordinate system that is defined at the center of the cursor-interface icon 630.

Figure 11:
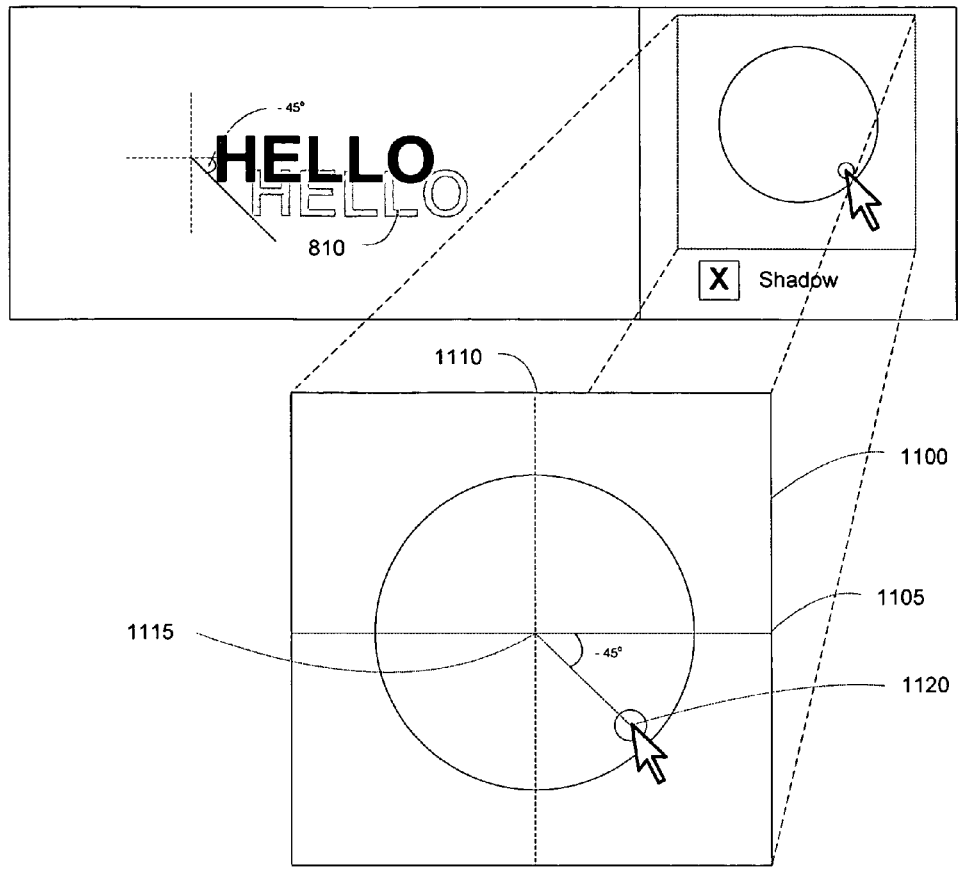
FIG. 11 illustrates a block diagram of a GUI showing a method for defining a cursor position.

FIG. 11 illustrates an example of one such manner of defining the cursor position. Specifically, this figure illustrates a coordinate system 1100 of the cursor-interface icon. This coordinate system includes an x-axis 1105 and a y-axis 1110 that intersect at an origin 1115 at the center of the cursor-interface icon 630. This figure also illustrates a cursor location 1120 on the cursor-interface icon 630. This location is at a −45° angle in the coordinate system 1100 (i.e., cursor location 1120 is at a −45° angle with respect to the x-axis of this coordinate system). Accordingly, if a user selects the cursor-interface icon 630 while the cursor is at location 1120, the process 1000 correlates (at 1020) the location 1120 with the −45° angular position of the cursor in the coordinate system 1100 of the cursor-interface icon 630. The process also associates (at 1020) the −45° angular position of the cursor to a −45° angular position of the shadow.

After 1020, the process 1000 displays (at 1030) the shadow of the text at the position of the shadow that it identified at 1020. For instance, in the example illustrated in FIG. 11, the process displays (at 1030) the shadow of the text at a −45° position with respect to the text.

Figure 12:
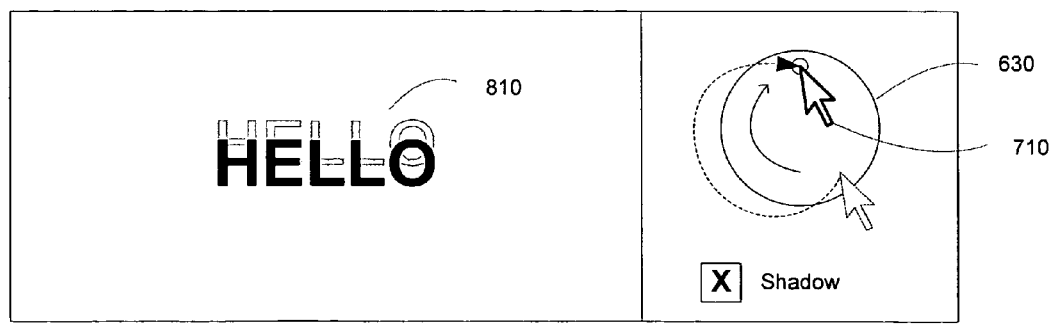
FIG. 12 illustrates a block diagram of a GUI showing the path of a cursor while modifying a shadow on a text.

Next, at 1040, the process determines whether the user is moving the cursor while still maintaining the selection of the cursor (e.g., whether the user is moving the cursor while still pressing the cursor controller button that led to the selection of the cursor). If so, the process identifies (at 1060) the new cursor position relative to the cursor-interface icon 630 and associates this position with a position of the shadow with respect to the text displayed in the text field 610. FIG. 12 illustrates an example of this operation. Specifically, this figure illustrates the movement of the cursor from the −45° angle illustrated in FIG. 11 to a −270° angle. At 1060, the process 1000 would associate this position to a −270° position of the shadow.

After 1060, the process 1000 returns to 1030 to display the shadow of the text at the position of the shadow that it identified at 1060. For instance, in the example illustrated in FIG. 12, the process displays (at 1030) the shadow of the text to be at a −270° position with respect to the text.

The process loops through 1030, 1040, and 1060 until it determines (at 1040) that the user is no longer moving the cursor. When the process makes this determination, it transitions to 1050. At 1050, the process determines whether the user is no longer selecting the cursor-interface icon 630 (e.g., whether the user has terminated the cursor controller click operation that led to the selection of the cursor-interface icon 630). If so, the process terminates. Otherwise, the process returns to 1040, which was described above.

One of ordinary skill will realize that numerous other processes can be used to associate cursor interactions with the cursor-interface icon 630 to modifications of the shadow effect. For instance, in some embodiments, the process 1000 starts when it detects a click operation on the cursor-interface icon. In other embodiments, however, this process only starts after it has detected a click-and-drag operation on the cursor-interface icon. In some of these embodiments, the process does not modify the position of the shadow until the cursor-interface icon 630 has captured a cursor movement.

Also, the process 1000 performs the shadow-modification operation 1020 right after it detects the selection of the cursor-interface icon 630. This operation immediately "snaps" the shadow to the shadow position associated with the position of the cursor at the time of the selection.

Other embodiments, however, might not "snap" the shadow to a new position at the time of the selection. Instead, these embodiments might simply associate the position of the shadow at the time of the selection with the position of the cursor at the time of the selection. These embodiments then modify the shadow position based on the movement of the cursor position relative to the cursor position at the time of the selection.

Figure 13:
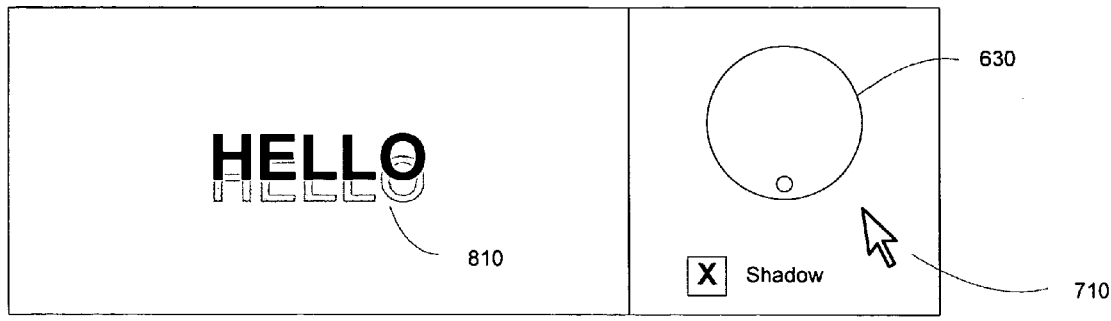
FIG. 13 illustrates a block diagram of a GUI showing a cursor before selecting a cursor interface under an embodiment of the invention.
Figure 14:
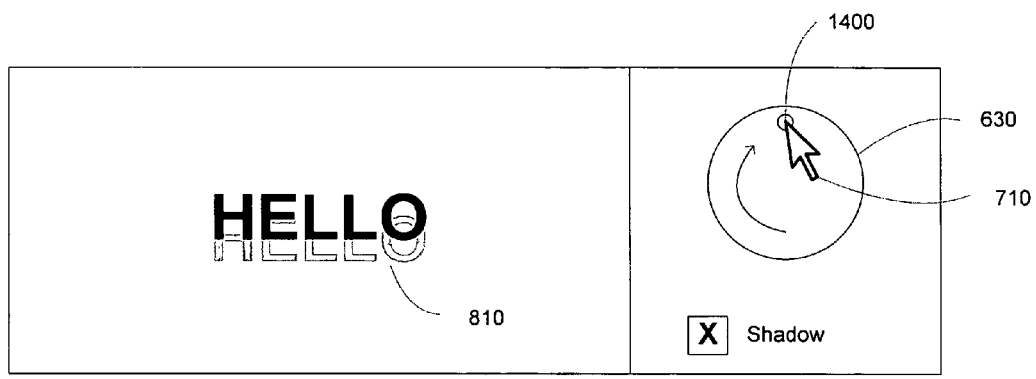
FIG. 14 illustrates a block diagram of a GUI showing a cursor selecting a cursor interface under an embodiment of the invention.
Figure 15:
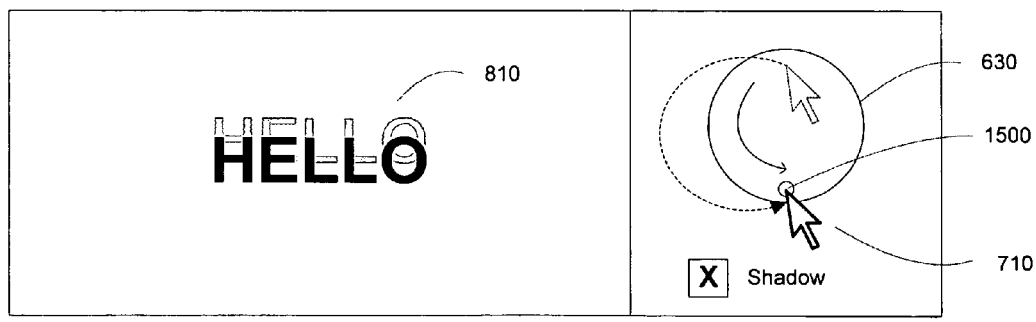
FIG. 15 illustrates a block diagram of a GUI showing the path of a cursor while modifying a shadow on a text under an embodiment of the invention.

FIGS. 13-15 illustrate an example of such an approach. Specifically, FIG. 13 illustrates a −90° position of shadow with respect to a text before the selection of the cursor-interface icon 630. FIG. 14 then illustrates the selection of the cursor-interface icon 630 by placing the cursor 710 at position 1400 and performing a click operation. As shown in this figure, this selection does not modify the position of the shadow 810.

Next, FIG. 15 illustrates the movement of the cursor 710 from position 1400 to position 1500. As shown in this figure, this cursor movement is a 180° movement in the counter-clockwise direction across the coordinate system of the cursor-interface icon 630. Accordingly, as shown in FIG. 15, this movement results in a 180° movement in the counterclockwise direction of the shadow from a position that is below the text to a position that is above the text.

In the first iteration of the process through 1060, the process identifies the movement of the cursor since the selection of the cursor-interface icon 630. In each subsequent iteration of the process through 1060, the process identifies the movement of the cursor from the immediately prior iteration of the process through 1060.

Figure 16:
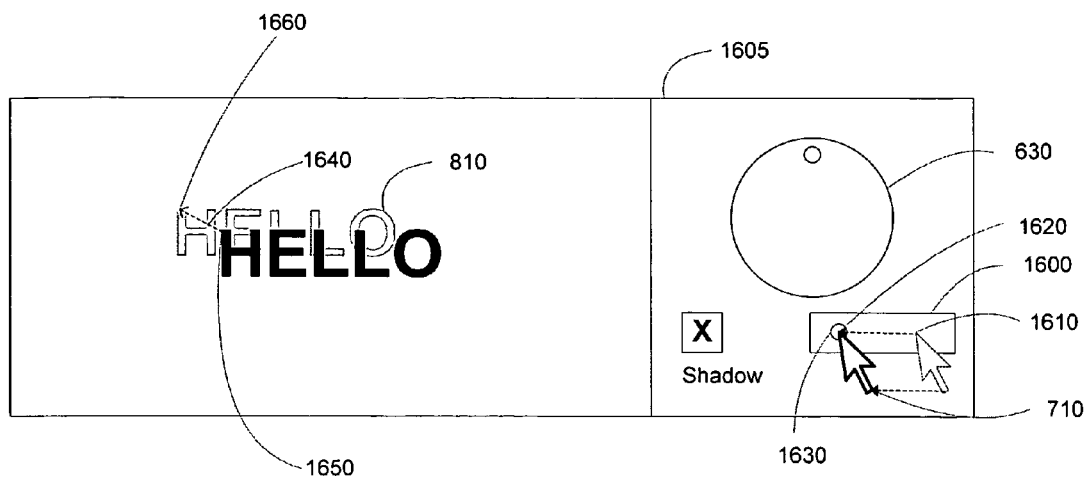
FIG. 16 illustrates a block diagram of a GUI with multiple cursor interfaces.

Furthermore, in some embodiments, there may be multiple control elements that apply a shadow effect to a text. FIG. 16 illustrates a GUI 1605 that includes two cursor-interface icons 630 and 1600. Much like the cursor-interface icon 630, the cursor-interface icon 1600 detects a movement of the cursor and correlates that cursor movement into a movement of a shadow effect. However, unlike the icon 630 which captures angular displacement of the cursor that are translated to angular displacements of the shadow of a text, the icon 1600 captures linear displacements of the cursor that are translated to radial displacements of the shadow of the text.

FIG. 16 illustrates an example of the capture of the linear displacement of a cursor and the translation of this displacement to such an embodiment. FIG. 16 illustrates a selection of the cursor-interface icon 1600 by placing the cursor 710 at position 1610 and performing a click operation. Furthermore, FIG. 16 illustrates the movement of the cursor 710 from position 1610 to position 1620. As shown in this figure, the cursor-interface icon 1600 has a knob 1630 that moves horizontally. Accordingly, the movement of the cursor from position 1610 to the position 1620 moves the knob 1630 from position 1610 to position 1620, which is translated in the movement of the shadow 810 in the radial direction 1640 from position 1650 to position 1660. In other words, the movement of the knob 1630 modifies the radial distance between the text and its shadow (i.e., the distance from the text to the shadow). This control of the radial distance of the shadow complements the angular displacement of the shadow that is provided through the cursor-interface control 630.

Figure 18:
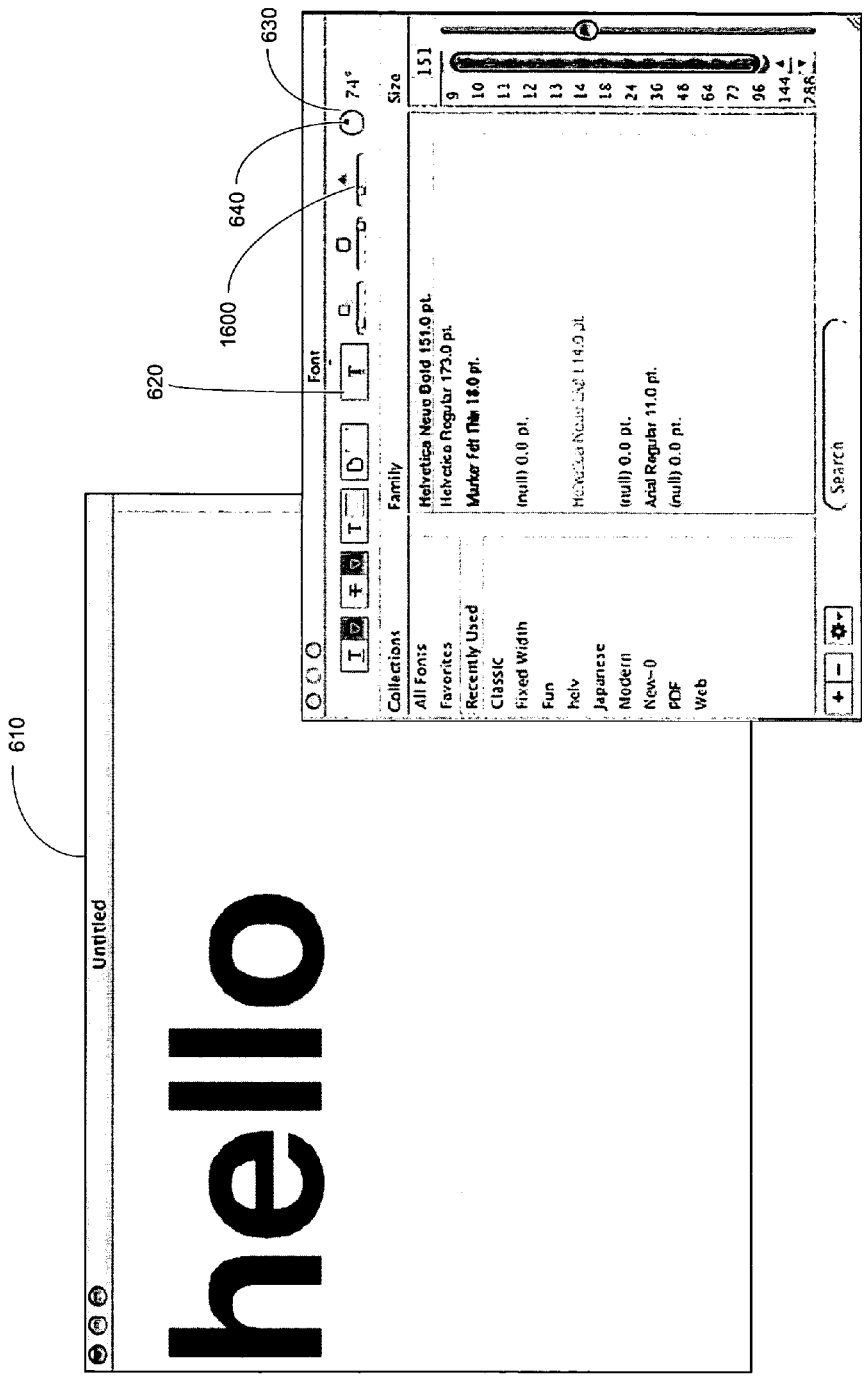
FIG. 18 illustrates an application with an embodiment of the invention.

FIG. 18 shows an application that illustrates an embodiment of the invention, and its corresponding GUI. The GUI includes a text field 610, a shadow-enable box 620, a cursor-interface icon 630, and a knob icon 640. The text field 610 is a window that displays the text to which a shadow can be applied. In this example, the text field 610 is its own separate window. In other embodiments, the text field 610, the shadow-enable box 620, the cursor-interface icon 630, and the knob icon 640 are part of the same window.

The shadow-enable box 620 is a selectable rectangular icon that allows a user to enable the shadow option. To enable the shadow option, a user moves a cursor over the shadow-enable box 620 and selects it by performing a click operation.

The cursor-interface icon 630 is a circular slider that allows the user to rotate the shadow about the text in the window. The user can change the angle of the shadow relative to the text by selecting the circular slider (or an area that is near the boundary of the circular slider) and maintaining the selection, then moving the cursor in such a way as to correlate the position of the cursor to the desired position of the shadow relative to the text.

The knob icon 640 is an object that indicates the orientation of the cursor-interface icon 630 and accordingly the position of the shadow relative to the text. In this instance, the knob icon 640 is oriented roughly towards the top of the page. As such, if the shadow option is enabled, then the shadow would be located above the text.

IV. Computer System

Figure 17:
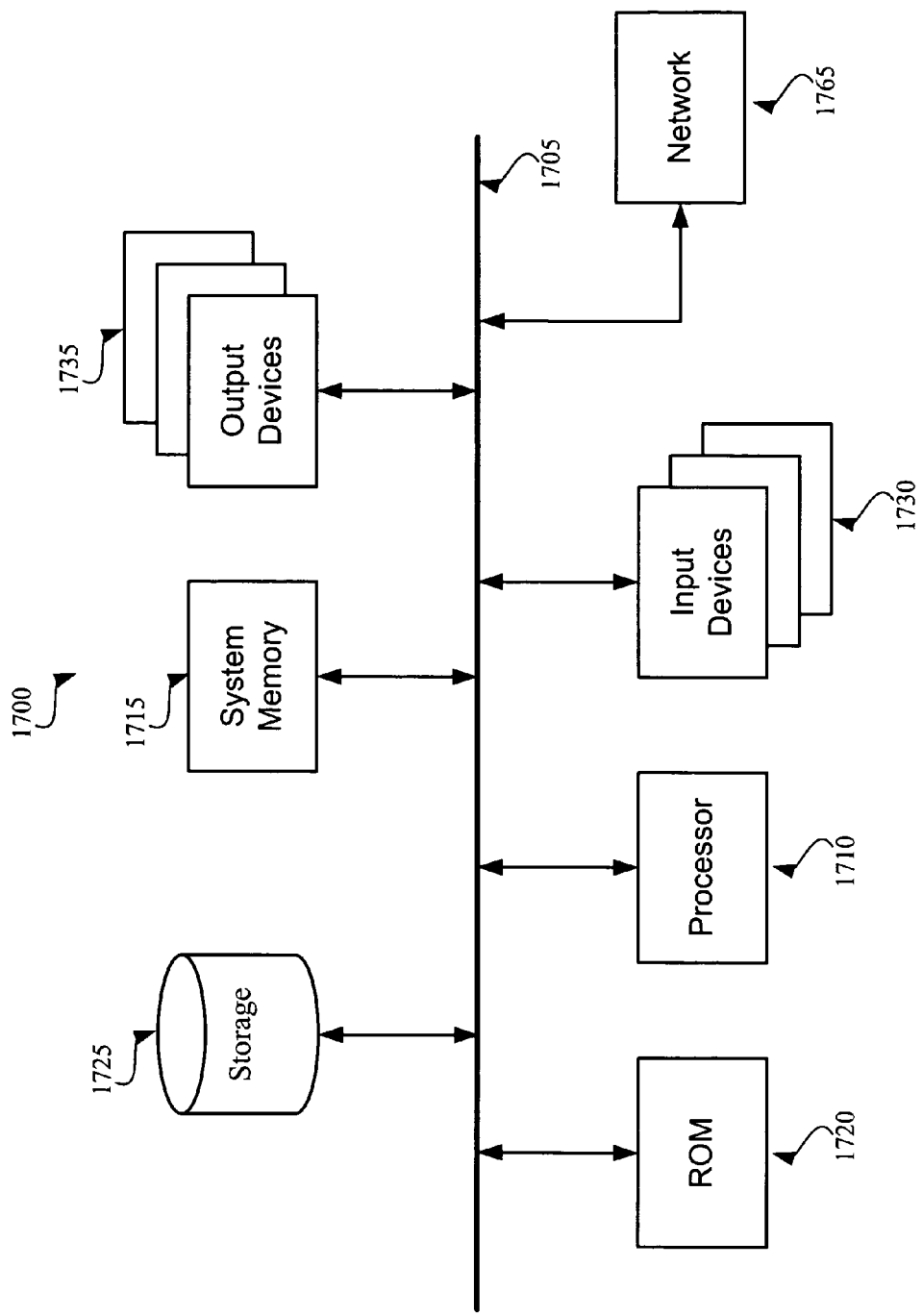
FIG. 17 illustrates a block diagram of a computer system.

FIG. 17 presents a computer system with which one embodiment of the invention is implemented. Computer system 1700 includes a bus 1705, a processor 1710, a system memory 1715, a read-only memory 1720, a permanent storage device 1725, input devices 1730, and output devices 1735. The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725.

From these various memory units, the processor 1710 retrieves instructions to execute and data to process in order to execute the processes of the invention. The read-onlymemory (ROM) 1720 stores static data and instructions that are needed by the processor 1710 and other modules of the computer system.

The permanent storage device 1725, on the other hand, is read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725.

Other embodiments use a removable storage device (such as a floppy disk or Zip® disk, and its corresponding disk drive) as the permanent storage device. Like the permanent storage device 1725, the system memory 1715 is a read-and-write memory device. However, unlike storage device 1725, the system memory is a volatile read-and-write memory, such as a random access memory. The system memory stores some of the instructions and data that the processor needs at runtime. In some embodiments, the invention's processes are stored in the system memory 1715, the permanent storage device 1725, and/or the read-only memory 1720.

The bus 1705 also connects to the input and output devices 1730 and 1735. The input devices enable the user to communicate information and select commands to the computer system. The input devices 1730 include alphanumeric keyboards and cursor-controllers. The output devices 1735 display images generated by the computer system. The output devices include printers and display devices, such as cathode ray tubes (CRT) or liquid crystal displays (LCD).

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1700 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For example, some of the figures illustrate the shadow-enable box 620 and the cursor-interface icon 630 as two separate elements of the GUI 600. In some embodiments, the shadow-enable box 620 and the cursor-interface icon 630 are separate because it facilitates the indication that the shadow option has been selected by the user. However, other embodiments combine the functions of both the shadow-enable box 620 and the cursor-interface icon 630 into a single component.

Figure 19:
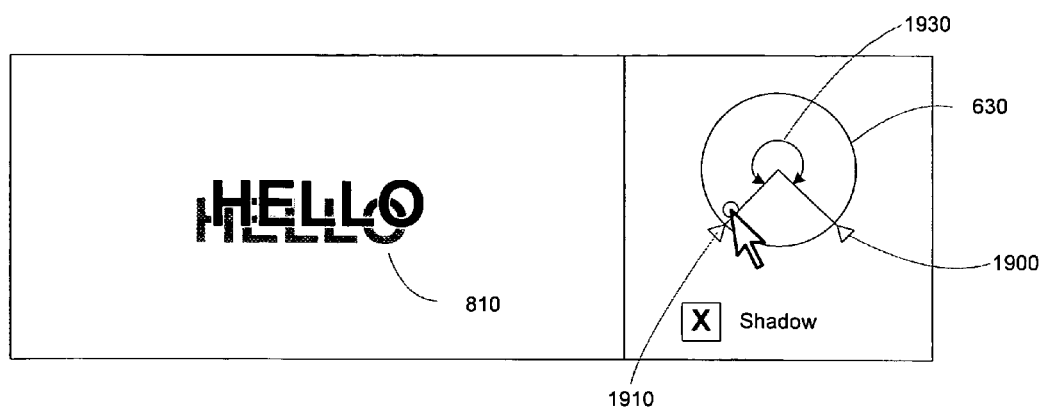
FIG. 19 illustrates a block diagram of a GUI with stops on the cursor interface.

In some embodiments, the cursor interface icon 630 movement is restricted by stops. FIG. 19 illustrates a cursor interface icon 630 that includes lower bound limit 1900 and an upper bound limit 1910. When the lower bound limit 1900 and the upper bound limit 1910 are positioned on the cursor interface 630, the movement of the cursor interface icon 630 is limited to a range 1930. This range limit angular displacements or translational or rotational motions that are defined through the cursor interface icon 630.

In some embodiments, the cursor interface icon 630 generates numerical values when a cursor interacts with it. In some of these embodiments, this icon can generate a set of values that is essentially unbounded (i.e., can produce a large set of values that for all intents and purposes is an "infinite" set of values). For instance, when cursor interface 630 is unbounded, the movements of the cursor are compounded for every full rotation of the cursor around the cursor interface icon 630. In this instance, when each rotation is associated with a value of 1000, two rotations of the cursor around the cursor interface icon 630 would produce a value of 2000 in some embodiments. Thus, one of ordinary skill in the art would understand that the invention is not to be limited by the foregoing illustrative details, but rather is to be defined by the appended claims.

What is claimed is:

1. A method of defining movement in a graphical user interface (GUI) of a computer system, the method comprising:
   detecting translation movements of a directional user gesture input across a first object in the GUI, wherein at least two of the detected translation movements of the directional user gesture input are neither parallel nor collinear; and
   for each detected translation movement, defining a rectilinear translation movement of a second object in the GUI parallel to and simultaneous with the corresponding detected translation movement of the directional user gesture input, the second object being a shadow of a third object in the GUI, wherein at least two of the defined rectilinear translation movements are neither parallel nor collinear.

2. The method of claim 1, wherein each rectilinear translation movement of the second object moves every point in the second object along a same rectilinear direction.

3. The method of claim 1,
   wherein detecting translation movements of the directional user gesture input comprises identifying different positions of the directional user gesture input in a first coordinate system of the GUI; and
   wherein defining rectilinear translation movements of the second object comprises associating the positions of the directional user gesture input with positions of the second object in a second coordinate system of the GUI.

4. The method of claim 1,
   wherein detecting translation movements of the directional user gesture input comprises identifying movements of the directional user gesture input in a first coordinate system of the GUI; and
   wherein defining translation movements of the second object comprises correlating the identified movements of the directional user gesture input to movements of the second object in a second coordinate system of the GUI.

5. The method of claim 1, wherein the third object is a text object in the GUI.

6. A computer readable storage medium storing a computer program comprising a graphical user interface (GUI), the GUI comprising:
   a first object having a corresponding shadow; and
   a second selectable object having a two-dimensional shape having a surface area for interacting with a directional user gesture input within the surface area to define curvilinear movements of the shadow about the first object, the second selectable object having a plurality of bound limits that (i) limit the interactions with the directional user gesture input to a particular portion of the surface area and (ii) limit an angular distance the shadow can move in a single movement.

7. The computer readable storage medium of claim 6, wherein points that surround the second selectable object are also selectable by the directional user gesture input to define movements of the shadow.

8. The computer readable storage medium of claim 6, wherein the curvilinear movements include curvilinear translation movements of the shadow.

9. The computer readable storage medium of claim 6, wherein a particular curvilinear movement about the first object moves every point in the shadow along a same curvilinear direction.

10. The computer readable storage medium of claim 6, wherein the angular distance the shadow can move in a single movement is less than 360 degrees.

11. A computer readable storage medium storing a computer program comprising a graphical user interface (GUI), the GUI comprising:
 a first object having a corresponding shadow; and
 a second object having a two-dimensional shape having a surface area for detecting translation movements of a directional user gesture input across the surface area, wherein at least two of the detected translation movements of the directional user gesture input are neither parallel nor collinear, each detected translation movement of the directional user gesture input defining a rectilinear translation movement of the shadow within the GUI parallel to and simultaneous with the corresponding detected translation movement of the directional user gesture input, wherein at least two of the defined rectilinear translation movements are neither parallel nor collinear, wherein a first rectilinear translation movement of the directional user gesture input defines a movement of the shadow from a first position to a second position in the GUI and a second rectilinear translation movement of the directional user gesture input defines a movement of the shadow from the second position to a third position in the GUI.

12. The computer readable storage medium of claim 11, wherein each rectilinear translation movement of the shadow moves every point of the shadow along a same rectilinear direction.

13. The computer readable storage medium of claim 11, wherein the GUI further comprises a display area for displaying the first and second objects.

14. A computer readable storage medium storing a computer program which when executed by at least one processor displays a graphical user interface (GUI) for defining movements in the GUI, the computer program comprising sets of instructions for:
 displaying a first object in the GUI having a corresponding shadow; and
 displaying a second selectable object in the GUI having a two dimensional shape having a surface area for interacting with a directional user gesture input within the surface area to define curvilinear movements of the shadow about the first object within the GUI, the second selectable object having a plurality of bound limits that (i) limit the interactions of the directional user gesture input to a particular portion of the surface area and (ii) limit the movements of the shadow to less than a full rotation about the first object.

15. The computer readable storage medium of claim 14, wherein the particular portion of the surface area is less than 360 degrees.

16. A computer readable storage medium storing a computer program comprising a graphical user interface (GUI), the GUI comprising:
 a first display area for receiving an input text and displaying the input text, the input text received via an input device;
 a shadow enable tool for causing a shadow of the displayed input text to be displayed in the first display area; and
 a second display area comprising a plurality of contiguous selectable locations, the second display area for receiving a selection of a location from the plurality of locations said selected location within the second display area, wherein the selection causes the shadow to move from an initial position to a subsequent position in the first display area relative to the input text without the shadow being displayed at any intervening position, wherein the initial position and the subsequent position are not adjacent, wherein the initial position corresponds to a particular location within the second display area that is not adjacent to the selected location within the second display area, wherein the subsequent position is defined based on the selected location within the second display area.

17. The computer readable storage medium of claim 16, wherein the second display area is a circular slider.

18. The computer readable storage medium of claim 16, wherein the second display area is for defining an angle between the displayed input text and the shadow of the displayed input text.

19. The computer readable storage medium of claim 18, wherein the GUI further comprises a slider for defining a radial distance between the displayed input text and the shadow.

20. The computer readable storage medium of claim 16, wherein the first and second display areas are displayed in a same window.

21. The computer readable storage medium of claim 16, wherein the first and second display areas are displayed in different windows.

22. A computer readable storage medium storing a computer program for execution by at least one processor, the computer program comprising sets of instructions for:
 receiving an input text in a first display area;
 displaying the input text in the first display area;
 detecting a selection of a shadow-enable tool in a second display area that causes a shadow of the displayed input text to be displayed at a first location in the first display area, said first location in the first display area corresponding to a first location in the second display area;
 detecting a selection of a second location in the second display area, wherein the first and second locations in the second display area are not adjacent; and
 moving the display of the shadow from the first location to a second location in the first display area based on the selection of the second location in the second display area without any intervening display of the shadow between the first and second locations in the first display area.

23. The computer readable storage medium of claim 22, wherein the set of instructions for moving the display of the shadow comprises a set of instructions for defining a radial distance between the displayed input text and the shadow.

24. The computer readable storage medium of claim 22, wherein the set of instructions for moving the display of the shadow comprises a set of instructions for defining an angle between the displayed input text and the shadow.

25. A method of implementing a graphical user interface (GUI) for a program executing on a computing device, the method comprising:
 providing a first display area for receiving an input text and displaying the input text, the input text received via an input device;

providing a shadow enable tool that causes a shadow of the displayed input text to be displayed in the GUI of the first display area; and providing a second display area for receiving a selection of a location within the second display area, wherein the selection of the location causes the shadow to move from an initial position to a subsequent position in the first display area relative to the input text without the shadow being displayed at any intervening position, wherein the initial position and the subsequent position are not adjacent, wherein the subsequent position is defined based on the selected location within the second display area.

26. The method of claim 25, wherein the first and second display areas are displayed in a same window of the GUI.

27. The method of claim 25, wherein the second display area is a circular slider.

28. A method comprising:
receiving an input text in a first display area;
displaying the input text in the first display area;
detecting a selection of a shadow-enable tool in a second display area that causes a shadow of the displayed input text to be displayed at a first location in the first display area, said first location in the first display area corresponding to a first location in the second display area;
detecting a translation movement of a directional user gesture input that commences with a selection of a second location in the second display area and ends at a third location in the second display area, wherein the first and second locations in the second display area are not adjacent;
upon selection of the second location in the second display area, moving the display of the shadow from the first location to a second location in the first display area without any intervening display of the shadow between the first and second locations in the first display area; and
after the display of the shadow is moved to the second location in the first display area, moving the display of the shadow from the second location to a third location in the first display area based on the detected translation movement of the directional user gesture input.

29. The method of claim 28, wherein moving the display of the shadow from the first location to the second location in the first display area comprises defining a first angle between the displayed input text and the shadow, wherein moving the display of the shadow from the second location to the third location in the first display area comprises defining a second angle between the displayed input text and the shadow.

30. The method of claim 28, wherein moving the display of the shadow from the first location to the second location in the first display area comprises defining a first radial distance between the displayed input text and the shadow, wherein moving the display of the shadow from the second location to the third location in the first display area comprises defining a second radial distance between the displayed input text and the shadow.

31. A computer readable storage medium storing a computer program for execution by at least one processor, the computer program comprising sets of instructions for:
detecting translation movements of a directional user gesture input across a first object in a graphical user interface (GUI), wherein at least two of the detected translation movements of the directional user gesture input are neither parallel nor collinear; and defining rectilinear translation movements of a second object in the GUI based on the detected translation movements, the second object being a shadow of a third object in the GUI, wherein at least two of the defined rectilinear translation movements are neither parallel nor collinear, wherein each translation movement of the second object is parallel to a corresponding detected translation movement of the directional user gesture input.

32. The computer readable storage medium of 31,
wherein the set of instructions for detecting translation movements of the directional user gesture input comprises a set of instructions for identifying movements of the directional user gesture input in a first coordinate system of the GUI; and
wherein the set of instructions for defining rectilinear translation movements of the second object comprises a set of instructions for correlating the identified movements of the directional user gesture input to movements of the second object in a second coordinate system of the GUI.

33. The computer readable storage medium of 31, wherein the set of instructions for defining rectilinear translation movements of the second object comprises a set of instructions for moving every point in the second object along a same rectilinear direction.

34. A method of defining movement in a graphical user interface (GUI), the method comprising:
displaying a first object in the GUI centered at the origin of a first coordinate system, the first object having an associated shadow; and
displaying a second object in the GUI centered at the origin of a second coordinate system, the second object comprising a two dimensional shape having a surface area and a region surrounding the two-dimensional shape in the GUI, the second object for detecting translation movements of a directional user gesture input across the surface area and surrounding region of the two-dimensional shape that specify positions in the second coordinate system, wherein at least two of the detected translation movements of the directional user gesture input are neither parallel nor collinear, said detected translation movements of the directional user gesture input defining rectilinear translation movements of the shadow within the GUI, wherein the positions of the directional user gesture input in the second coordinate system correspond to positions of the shadow in the first coordinate system, wherein at least two of the defined rectilinear translation movements are neither parallel nor collinear, wherein each translation movement of the shadow is parallel to a corresponding detected translation movement of the directional user gesture input.

35. The method of claim 34, wherein the rectilinear translation movements of the shadow move every point of the shadow along a same rectilinear direction.

36. The method of claim 34 further comprising:
displaying a first window in the GUI, said first window containing the first object; and
displaying a second window in the GUI, said second window containing the second object.

* * * * *